United States Patent
Snider

[11] 3,719,440
[45] March 6, 1973

[54] AIR OPERATED TOOL
[75] Inventor: Philip A. Snider, Hicksville, Ohio
[73] Assignee: Dotco, Inc., Hicksville, Ohio
[22] Filed: April 16, 1971
[21] Appl. No.: 134,588

[52] U.S. Cl. .................. 418/266, 415/503, 173/12
[51] Int. Cl. .......... F04c 1/00, F03b 13/04, B23q 5/00
[58] Field of Search ............ 418/266, 267, 268, 270; 173/12; 415/503

[56] References Cited
UNITED STATES PATENTS

| | | | |
|---|---|---|---|
| 2,552,840 | 5/1951 | Burke et al. | 418/266 |
| 3,231,237 | 1/1966 | Wermstrom | 415/503 |
| 3,309,965 | 3/1967 | Weickgenannt | 415/503 |

FOREIGN PATENTS OR APPLICATIONS

| | | | |
|---|---|---|---|
| 354,893 | 7/1961 | Switzerland | 415/503 |

Primary Examiner—Henry F. Raduazo
Attorney—Oberlin, Maky, Donnelly & Renner

[57] ABSTRACT

An air operated tool having a rotary air motor of which the tool holding rotor is supported for high speed accurate rotation by preloaded ball bearings adjacent the ends of the rotor. The tool herein is characterized in that a Belleville spring is employed to eliminate axial play of the rotor and to preload the ball bearings to desired precise extent.

8 Claims, 3 Drawing Figures

PATENTED MAR 6 1973 3,719,440

INVENTOR.
PHILIP A. SNIDER
BY
Oberlin, Maky, Donnelly & Renner
ATTORNEYS

AIR OPERATED TOOL

BACKGROUND OF THE INVENTION

High speed air tools are known for example, from the Doeden et al. U.S. Pat. No. 3,439,422, in which the rotor is supported for rotation by ball bearings adjacent the ends of the motor stator. However, no provision is made for take-up of axial end play nor to preload the bearings to precise desired extent, and hence, the tool may vibrate or chatter particularly at high speeds which may exceed 60,000 r.p.m. Moreover, even if an axial preloading means is provided it would traditionally comprise a threaded adjusting member or a shim which effects axial movement of one of the outer bearing rings with respect to its inner bearing on the rotor and, in turn, the other inner bearing ring on the rotor is moved axially with respect to its outer bearing ring thus to take up axial end play and to preload the bearings. As apparent, precise adjustment of preload with threaded adjusting members or shims is difficult and therefore there is the problem of short bearing life or damage due to excessive preload thereof. Moreover, with such screw or shim adjustment of preload, end play and loss of accuracy may develop after extended use of the tool whereby the bearing assembly must be periodically readjusted or thicker shims substituted.

SUMMARY OF THE INVENTION

Contrary to known air tools and to known preload adjusting mechanisms for the ball bearings thereof, the present invention has for its principal object the provision of a ball bearing supported air motor rotor for an air tool which embodies a novel preloading device which takes up axial end play and which applies a predetermined preload on the bearings during assembly of the air motor without possibility of overload and without necessity of periodic adjustment as the ball bearings wear and develop axial and radial play and consequent loss of precision and permanence of the coaxial rotation of the rotor and tool carried thereby.

It is another object of the present invention to provide novel means and method for preloading ball bearings of an air tool which facilitates assembly of the air motor and which assures correct preload for increased tool life and accurate and sturdy support for the tool carrying rotor without vibration or chatter.

Other objects and advantages of the present invention will appear hereinafter.

DETAILED DESCRIPTION OF THE INVENTION

Figures 1, 2:
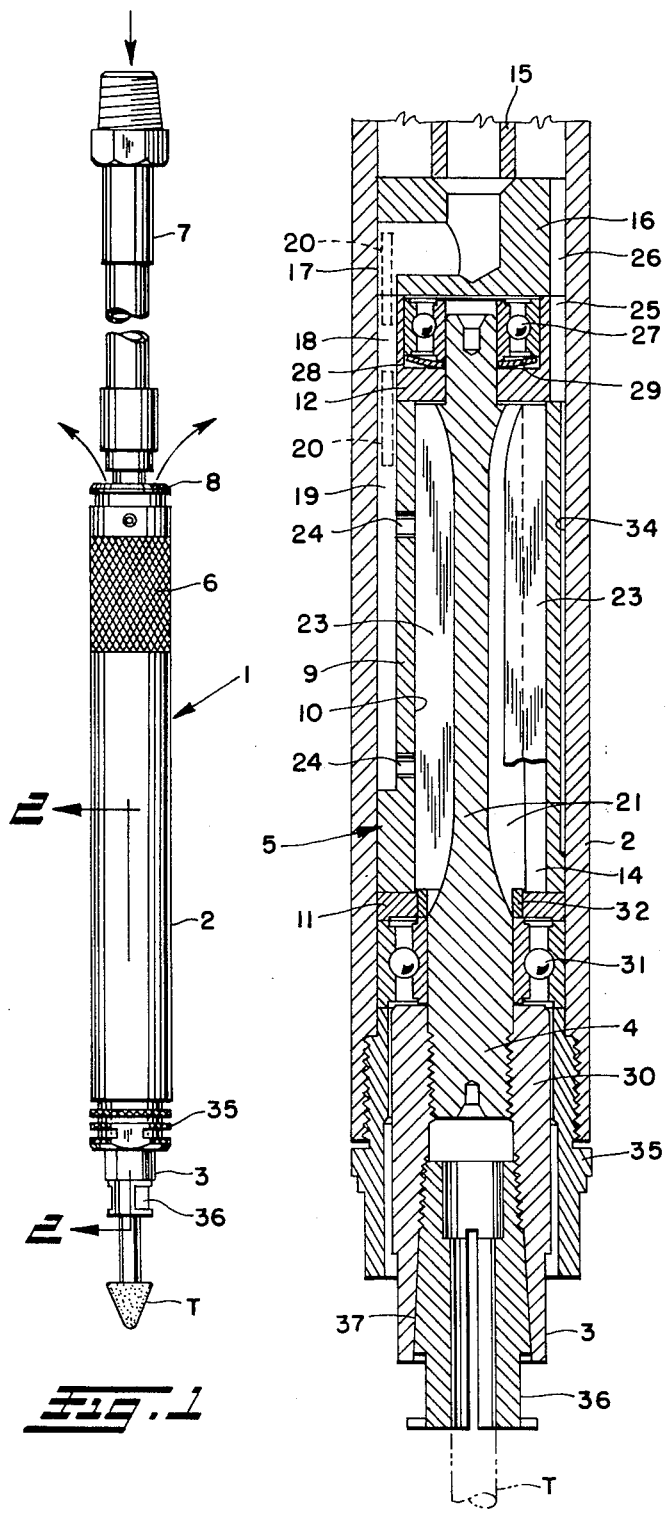
FIG. 1 is a side elevation of an air operated tool constructed in accordance with the present invention.
FIG. 2 is an enlarged fragmentary cross-section view of the air motor end of the tool of FIG. 1 taken substantially along the line 2—2, FIG. 1.

As shown in FIG. 1, the air operated tool 1 herein comprises an elongated cylindrical housing 2 which is adapted to be held by the operator and having a collet chuck 3 or the like at its lower end by which the shank of a rotary tool T is adapted to be gripped with its axis coinciding with the axis of the rotor 4 of the air motor 5 disposed within said housing 2. Adjacent the upper end of the housing 2 is a rotary valve sleeve 6 which controls the amount of air which is permitted to enter the motor from the air supply line 7. Air from the motor 5 is exhausted from the upper end of the housing 2 as shown by the arrows in FIG. 1, or if desired, a flexible hose may be connected to the fitting 8 in radially spaced relation to the air supply line 7 to exhaust the air at a zone still farther away from the working area of the tool 1. See, for example, the U.S. Pat. to Snider No. 3,502,158 for an air motor construction having a rear exhaust and provided with an overhose extending axially away from the tool 1.

In general, the air motor 5 herein disclosed is quite similar to that shown in the Doeden et al. U.S. Pat. No. 3,439,422, in that it comprises a stator assembly including a stator 9 having an eccentrically disposed bore 10 therethrough and end plates 11 and 12 at the opposite ends to define a motor chamber 14 therein into which air under pressure is admitted through the air feed stem 15 from the aforesaid valve 6 and the fitting 16 which has a passage 17 registering with passages 18 and 19 in end plate 12 and stator 9. These parts 16, 17, and 9 are secured together against relative rotation as by means of the dowel pins 20.

Rotatable within the stator 9 is the rotor 4 which is provided with a plurality of radial slots 21 in which vanes 23 of plastic or like material are radially slidable in contact with the eccentric bore 10 of the stator 9, thus to effect rotation of the rotor 4 upon admission of air pressure into the chamber 14 through the openings 24 in the stator 9. As well known, the stator 9 will be provided with exhaust passages (not shown) to exhaust air from the motor 5 through the passages 25 and 26.

The rear end portion of the rotor 4 has press fitted thereon the inner ring of a ball bearing 27 and the outer ring thereof is a slide fit in the bore 28 of the end plate 12, the combined thickness of the bearing 27 and the Belleville spring washer 29 being less than the depth of the bore 28 for a purpose which will presently be described.

The front end of the rotor 4 has clamped thereto as by means of the chuck body 30 the inner ring of a ball bearing 31 there being a spacer ring 32 of the same thickness as the peripheral portion of end plate 11 between said inner ring and the end of the slotted portion of the rotor 4.

In assembling the air motor, and thereby automatically obtaining takeup of axial play of the rotor 4 and a precise preloading of the bearings 27 and 31, an anvil having a plane end engaged with the rear end of both rings of the bearing 27 presses the latter onto the rotor 4 until the Belleville spring washer 29 is flattened. When the pressing force of the anvil is removed the Belleville spring 29 will tend to assume its original dished shape thereby to exert axial upward force on the outer ring of the bearing 27 to takeup end play in the latter and upward movement of the rotor 4 moves the inner ring of bearing 31 upwardly to takeup end play in the latter. The upward force of the spring 29 also preloads both bearing 27 and 31.

Upon assembly, as above described, the motor 5 is inserted into the bore 34 of the housing 2 together with the inlet and exhaust fitting 16 until the latter engages and seats against the end of the air pressure feed stem 15. The motor 5 is clamped in place as by means of the threaded sleeve 35 which engages the outer ring of the earing 31 and clamps the end plate 11, the stator 9, the end plate 12, and the fitting 16 against the inlet stem 15.

The chuck body 30 receives a contractible collet 36 and as evident when the shank of a tool T is inserted into the collet 36, the tightening of the collet 36 will, by the coaction of the tapered surfaces 37, be contracted to tightly and accurately grip the tool T in coaxial relation to the rotor 4.

By taking up end play and preloading the bearings 27 and 31, the rotor 4 is accurately and permanently held for rotation about an axis coinciding with its central axis without axial or radial play so as to eliminate vibration and chatter as would otherwise occur when the rotor 4 is driven at 60,000 r.p.m. or at greater speed.

The Belleville spring 29 may be of conventional design comprising a dished washer having its concave side facing the rear bearing 27 and providing desired compressive force rearwardly against the outer ring of bearing 27. The compressive force of the Belleville spring 29 is dependent upon certain characteristics such as its diameter, cross-sectional profile, height, thickness and material. This rearward force as aforesaid acts against the outer bearing ring which imposes a similar rearward force against the inner ring which when acting against the fixed outer ring of the front bearing 31 places a tension preload on the rotor 4.

The amount of preload imposed upon the rotor 4 depends on the application intended for the tool. The important consideration is that the preload should be greater than any normal thrust load anticipated for the tool 1 so that there will be a tension force exerted on the front and rear bearings 31 and 27 of the tool 1 under all load conditions. It also prevents end play and vibration or chattering in the tool T.

Figure 3:
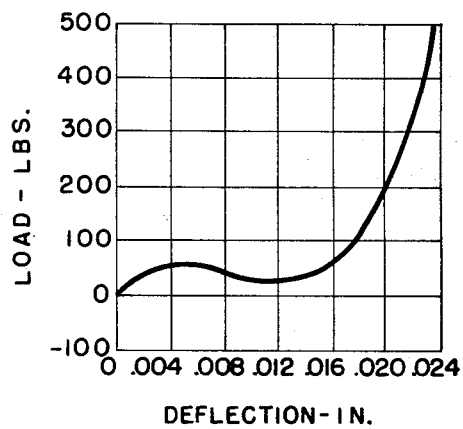
FIG. 3 is a graph illustrating the load-deflection characteristics of a Belleville spring as employed in the present invention.

FIG. 3 illustrates a typical deflection-load curve for a Belleville spring 29. The load for a spring deflection of from about 0.003 inch to about 0.009 remains nearly constant at about 50 lbs. In unloaded condition, the axial play in the motor 5 is usually 0.003 inch to 0.005 inch and therefore if the spring 29 is deflected, say 0.010 inch when flattened during assembly, it will spring back 0.003 inch to 0.005 inch plus the load deflection of the bearings 27 and 31 to takeup end play and to preload the bearings 27 and 31 when the assembly pressure is relaxed.

As the bearings 27 and 31 wear through extended use of the tool 1, the preload spring 29 will continue to exert the substantially constant preload force on the bearings 27 and 29 in the manner described so as to maintain the preload and to eliminate the development of axial and radial play thus to greatly enhance the life of the tool 1 and to assure vibration and chatter-free rotation of the rotor 4.

An advantage in preloading the rotor 4 shaft and bearings 27 and 31 with a Belleville spring 29 is that the bearings 27 and 31 cannot be overloaded as would be possible with known means for preloading of bearings. Belleville springs can be made with great accuracy and uniformity with reference to inside and outside diameters, thickness, deflection height to flattened condition, material, and heat treatment so that the bearing preload can be predetermined despite variation of end play from say 0.003 inch to 0.005 inch in an unloaded motor 5. Moreover, the preload will remain substantially constant despite wear of the bearings 27 and 31.

The outer ring of bearing 31, the end plates 11 and 12, and the stator 9 are all closely fitted in the bore 34 of housing 2 so that rotor 4 is accurately supported by the bearings 27 and 31 for rotation about its central axis which coincides with the axis of bore 34.

I, therefore, particularly point out and distinctly claim as my invention:

1. Preloading means for a motor having a rotor to which a rotary tool is adapted to be connected, a stator and motor housing assembly in which said rotor is rotatably supported by ball bearings adjacent the ends of said stator, said bearings having inner rings axially fixed on said rotor and outer rings closely fitted in said assembly, said means comprising spring means exerting axial separating force between one outer ring and the adjacent end of said stator while the other outer ring abuts the other end of said stator to relatively axially move said stator and the other outer ring and said rotor and inner rings thus to takeup axial play in both bearings and to preload them by imposition of tensile load on said rotor.

2. The preloading means of claim 1 wherein said spring means comprises a Belleville spring.

3. The preloading means of claim 2 characterized in that the Belleville spring is deflected from dished form to flattened form and springs back to partly dished form to maintain a substantially constant preload on said bearings despite tolerance variations in the axial play of said bearings and despite wear of said bearings in use.

4. The preloading means of claim 2 characterized in that said Belleville spring when deflected from dished form to flat form during assembly of said motor exerts, upon spring back to partly dished form, a substantially constant preload on said bearings despite tolerance variation in the axial play of said bearings and despite axial wear of said bearings during use.

5. An air operated tool comprising a tubular housing having an air motor therewithin including a stator assembly comprising a tubular stator and end plates abutting the ends of said stator and defining therewith a motor chamber, a rotor journaled in said housing having radially movable vanes thereon engaged with an eccentrically disposed bore in said stator and being adapted to mount a rotary tool at one end thereof, a first ball bearing having an inner ring axially fixedly secured on said rotor and an outer ring in abutting engagement with one end plate, a second ball bearing having an inner ring axially fixedly secured on said rotor and an outer ring which is closely slidably fitted in the other end plate, said housing and stator and other end plate defining a passage for supply of air under pressure to said motor chamber to effect rotation of said rotor, and spring means between the outer ring of said second bearing and said other end plate exerting axial separating force effecting relative axial movement of said rotor and inner rings and said end plates, stator and outer bearing ring of said first bearing thus to take up axial play in both bearings and to preload them by imposition of tensile load on said rotor.

6. The tool of claim 5 wherein said spring means comprises a Belleville spring.

7. The tool of claim 6 wherein said Belleville spring is deflected from dished form to flattened form and springs back to partly dished form to maintain a substantially constant preload on said bearings despite tolerance variations in the axial play of said bearings and despite wear of said bearings in use.

8. The tool of claim 6 wherein said Belleville spring when deflected from dished form to flat form during assembly of said motor exerts, upon spring back to partly dished form, a substantially constant preload on said bearings despite tolerance variation in the axial play of said bearings and despite axial wear of said bearings during use.

* * * * *